Aug. 15, 1967  T. B. OAKES  3,335,815
LAZY TONG DEVICES
Filed July 26, 1965  8 Sheets-Sheet 1

Aug. 15, 1967  T. B. OAKES  3,335,815
LAZY TONG DEVICES

Filed July 26, 1965  8 Sheets-Sheet

Aug. 15, 1967     T. B. OAKES     3,335,815
LAZY TONG DEVICES
Filed July 26, 1965          8 Sheets-Sheet
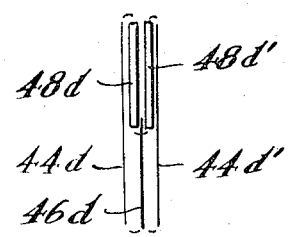
Fig. 30
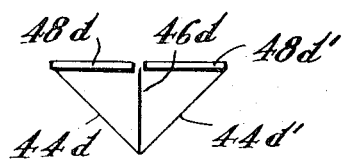
Fig. 31
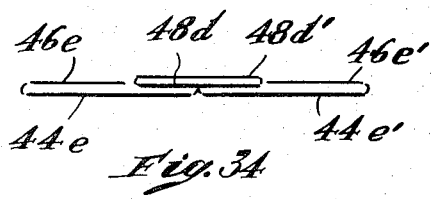
Fig. 34
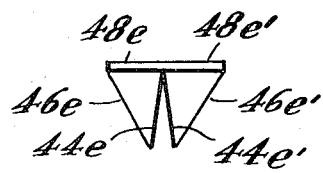
Fig. 35
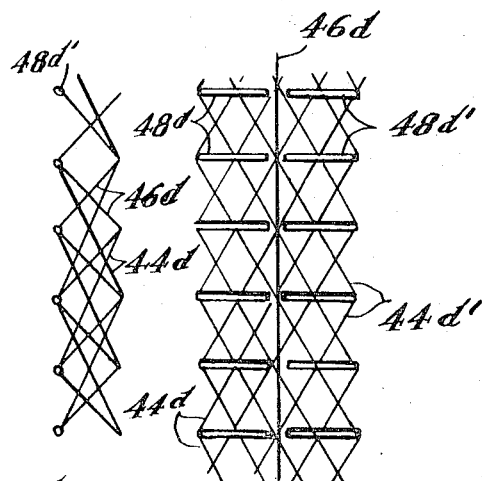
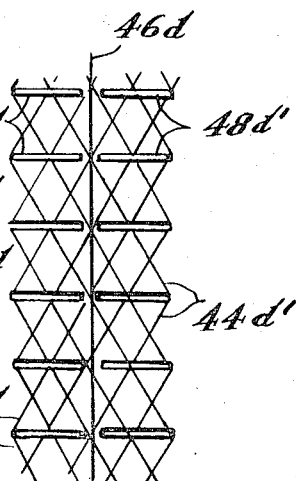
Fig. 33     Fig. 32
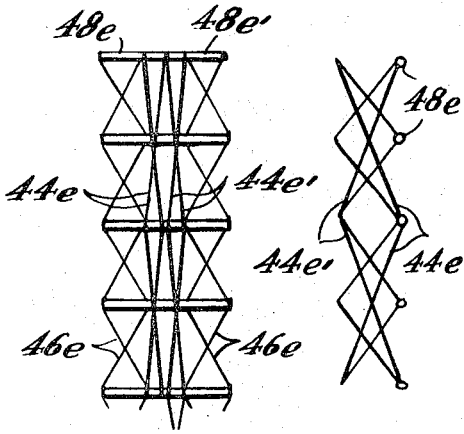
Fig. 36     Fig. 37
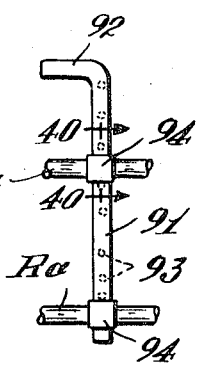
Fig. 38
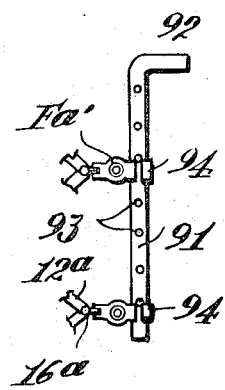
Fig. 39
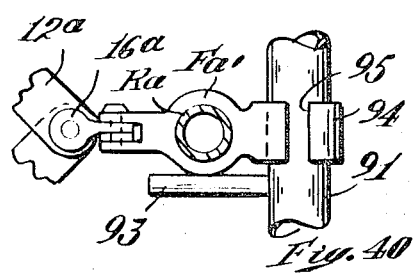
Fig. 40

United States Patent Office 3,335,815
Patented Aug. 15, 1967

3,335,815
LAZY TONG DEVICES
Thomas B. Oakes, % Thomas B. Oakes Construction
Co., Shelburne, Vt. 05482
Filed July 26, 1965, Ser. No. 474,607
19 Claims. (Cl. 182—157)

In general the present invention relates to extensible and contractable devices which utilize an arrangement of lazy tongs to achieve expansion and contraction. More particularly the present invention concerns such devices that embody more than one set of lazy tongs interconnected in a manner that yields a three-dimensional expanded device.

Prior three-dimensional lazy tong devices have retained their expanded cross-sectional area when fully contracted. This inherent limitation dictates that such devices occupy a volume when fully contracted and that considerable space is often required for storage. Another inherent limitation of such prior devices is that they are capable of extension in but one direction; that is, such devices cannot be deflected about a point intermediate to their extended length.

An object of the present invention is to provide an extensible and contractable device which is three-dimensional when expanded and which, upon contracting, collapses into an essentially flat body whereby the fully contracted device occupies but a minimum of space when not in use.

Another object of the present invention is to provide an extensible and contractable device that collapses into an essentially flat body when contracted and that is three-dimensional when expanded, which expanded device is nevertheless strong and structurally rigid.

Still another object of the invention is to provide an extensible and contractable device which, when extended to be three-dimensional, can be deflected about a point intermediate to its extended length and is so deflected with minimum loss of strength or structural rigidity wherein the versatility of such three-dimensional expansion devices is greatly enhanced.

In one aspect the present invention involves a lazy-tong device comprising three or more sets of collapsible links which, when the device is extended, are disposed respectively in different planes meeting at corners to define a polygonal space, the ends of each set of links being pivotally interconnected to the ends of the next adjacent sets at the aforesaid corners with hinges which pivot both lengthwise and crosswise of said planes, one of said sets comprising long links and the other sets each comprising relatively short links, and the length of the links of said one set approximating the sum of the lengths of the links of the other sets, whereby the links of the two sets lie approximately parallel when the device is collapsed. Preferably said one set consists of a single lazy tong the links of which approximate the sum of the lengths of the links of the other set.

In another aspect the present invention involves a lazy-tong device comprising three sets of collapsible links which, when the device is extended, are disposed respectively in three planes meeting at three corners to define a triangular space, the ends of each set of links being pivotally interconnected to the adjacent ends of the other sets at said corners with hinges which pivot both lengthwise and crosswise of the aforesaid planes, one of the sets comprising long links and the other two sets each comprising relatively short links, and the lengths of the long links approximating the sum of the lengths of the links of the other two sets, whereby the short links lie approximately parallel to the long links when the device is collapsed.

In another aspect the invention comprises the combination of three sets of links, each of which is a lazy tong, interconnected to expand simultaneously and in the same direction. Each lazy tong is composed of a plurality of pairs of pivotally connected links. The links of two sets are of equal length and pitch whereas the links of the remaining set are longer and disposed at a greater pitch. Pitch is used to generally denote the angle of inclination of the links from a plane perpendicular to the axis of expansion—the larger the angle, the greater the pitch. When expanded, the device is triangular in cross section with a section of each lazy tong forming each side; when contracted, the device is substantially flat in cross section with the two smaller sets side by side in the same plane and the larger set adjacent thereto in a parallel plane.

In another aspect the invention contemplates a discrete arrangement of cross arms, extensibly and contractably secured in spaced parallel relation to each other which are employed, in lieu of either one of the smaller sets of lazy tongs, in conjunction with one smaller set and the larger set of lazy tongs.

In another aspect the invention involves a base and mounting means for an expansion device that collapses into an essentially flat body when contracted. While various kinds of bases can be used a preferred kind is constructed as follows. The mounting means comprises a guide means secured parallel to the base. Attached to the guide means are rotatable supports which are connected to the lowermost links of the larger set of lazy tongs. Also secured parallel to the base is a channel guide that is perpendicular to the guide means. Slidably journaled in the guide is a slidable support which is connected to the corner of the two smaller sets of lazy tongs at their lowermost point. The contracted device then occupies a plane parallel to the base and is extended by first raising the contracted device to a position perpendicular to the base and then drawing the slidable support away from the guide means. This latter movement extends the device three-dimensionally to its full length.

In still another aspect the invention includes a supplementary superimposed lazy tong set to be used at the junction of two of the above devices joined end-to-end. The long links of each device are pivotally interconnected by a pair of breaking joints which pivot both longitudinally and transversely of the plane of the long links. The superimposed lazy tong is pivotally attached to the two devices at selected points along the corner formed by the junction of the sets of the short links of the two devices respectively. A second pair of breaking joints interconnects the lateral ends of links of the superimposed lazy tong. This second pair is disposed in such position relative to the two devices that both pairs of breaking joints lie in a plane that bisects the angle defined by the planes of the long links of the two interconnected devices. The superimposed lazy tong and the two pairs of breaking joints then permit the extended devices to be deflected about the axis of the first pair of breaking joints. The superposed set may be attached to either or both sets of links so long as the plane of the superposed tongs is parallel to the set of longer links and, if the superposed tongs are attached to both sets of short links at some point other than the link intersection, the pitch of the superposed tongs should be the same as the pitch of the set of long links.

For the purpose of illustration typical embodiments of the invention are shown in the accompanying drawings in which:

FIGS. 20 to 37 are diagrammatic views like the preceding views showing the addition of rungs to form ladders, these views corresponding to the preceding views as follows:

FIG. 20 is a plan view like FIG. 1 showing the ladder collapsed;

FIG. 21 is a plan view like FIG. 6 showing the ladder extended;

FIG. 22 is a front view like FIG. 7 showing the ladder extended;

FIG. 23 is a section on line 23—23 of FIG. 22;

FIG. 24 is a plan view like FIG. 1 showing a modified ladder collapsed;

FIG. 25 is a plan view like FIG. 6 showing the modified ladder extended;

FIG. 26 is a plan view like FIG. 1 showing another modified ladder collapsed;

FIG. 27 is a plan view like FIG. 6 showing the ladder extended;

FIG. 28 is a front view of the extended ladder;

FIG. 29 is a side view of the extended ladder;

FIG. 30 is a plan view like FIG. 8 of another modified ladder collapsed;

FIG. 31 is a plan view like FIG. 11 of the ladder extended;

FIG. 32 is a front view of the extended ladder;

FIG. 33 is a side view of the extended ladder;

FIG. 34 is a plan view like FIG. 30 showing another modified ladder collapsed;

FIG. 35 is a plan view with the ladder extended;

FIG. 36 is a front view with the ladder extended;

FIG. 37 is a side view with the ladder extended;

FIG. 38 is a front view of a device to hold a ladder extended;

FIG. 39 is a side view of the holding device;

FIG. 40 is a section on line 40—40 of FIG. 38;

Figure 1:
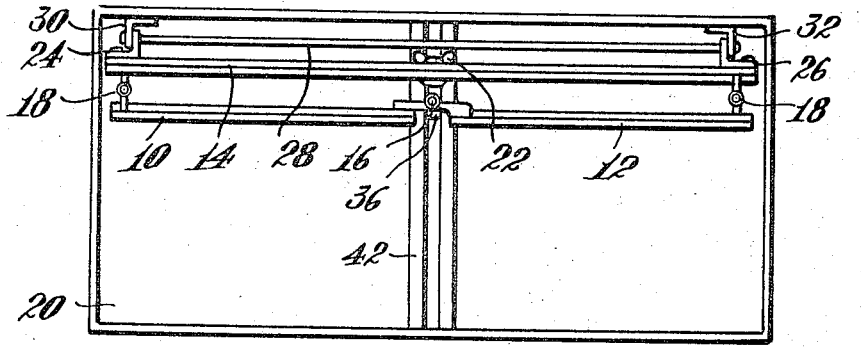
FIG. 1 is a plan view of the contracted device raised perpendicular to its base.
Figure 2:
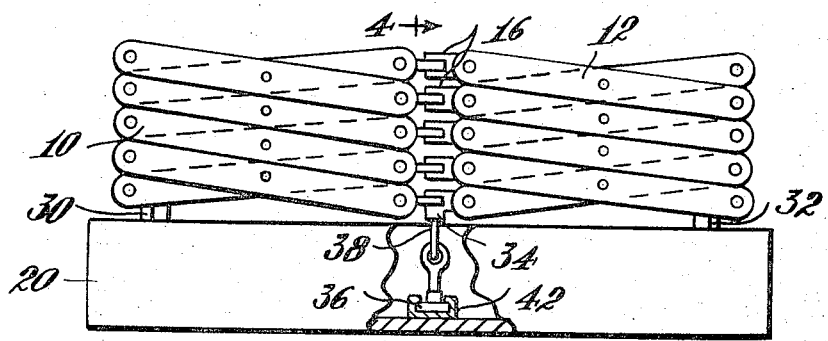
FIG. 2 is a front view of the contracted device with part of the base broken away to show support detail.
Figure 3:
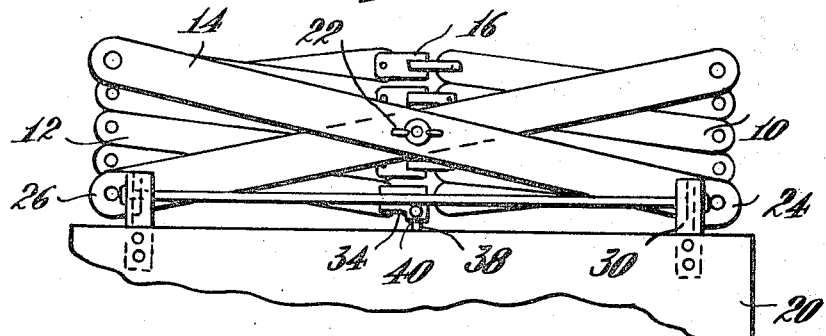
FIG. 3 is a rear view of the contracted device.
Figure 4:
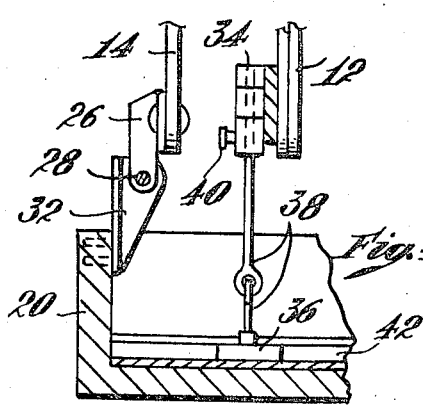
FIG. 4 is an enlarged partial section on line 4—4 of FIG. 2.
Figure 5:
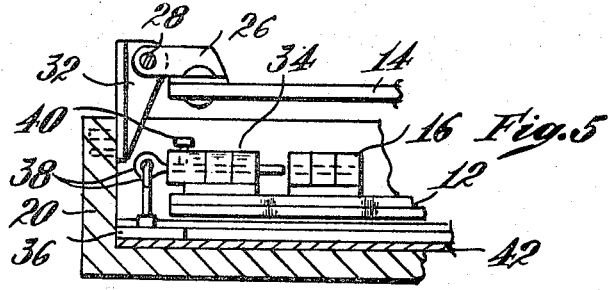
FIG. 5 is a section similar to FIG. 4 and shows the contracted device lowered parallel to the base.

One particular embodiment of the invention chosen for the purpose of illustration (FIGS. 1 through 7) has three sets of collapsible links each of which comprises a lazy tong. The links of two sets 10 and 12 are of equal length and those of the third set 14 are approximately twice this length. However the links of the two shorter sets may differ in length so long as the sum of the two lengths approximate the length of the longer links. The ends of the links of the two smaller sets 10 and 12 are pivotally interconnected to each other by hinges 16 and the ends of the links of the larger set 14 are pivotally interconnected to preselected ends of the two smaller sets 10 and 12 by hinges 18. These hinges 16 and 18 permit the interconnected links to move pivotally in the plane of their respective sets and, moreover, permit each set to move swingably with respect to the adjacent set. A base 20 is provided to which the lowermost links are supportably fastened at three points. The lowermost ends of the links of the larger set 14 are pivotally interconnected by a locking wing-nut 22 and pivotally attached to supports 24 and 26. These supports 24 and 26 are slidably and swingably mounted upon a guide rod 28 which is secured to the base 20 by brackets 30 and 32. The third point of support is marked by the lowermost hinge 34 which interconnects the lowermost links of the two smaller sets 10 and 12. This hinge 34 is coupled to a slidable support 36 by universal joint rods 38, the upper member of which is slidably journaled in hinge 34 and there secured by a set-screw 40. The support 36 is slidably seated in a channel guide 42 on the base 20 which extends at right angles to the guide rod 28.

Figure 6:
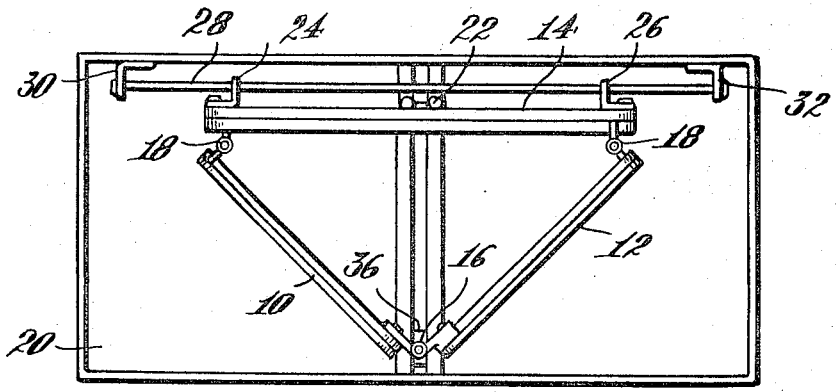
FIG. 6 is a plan view of the extended device.
Figure 7:
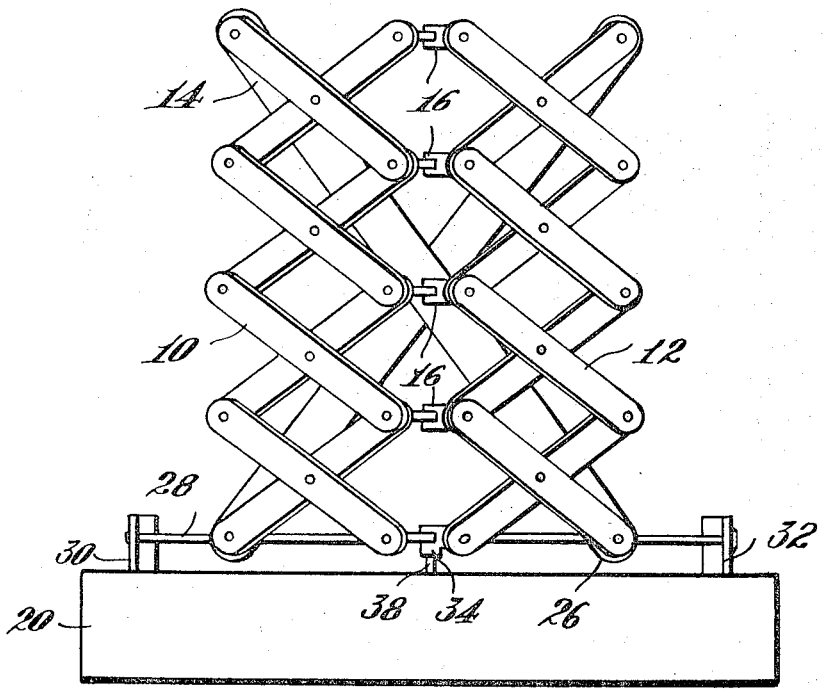
FIG. 7 is a front view of the extended device.
Figure 8:
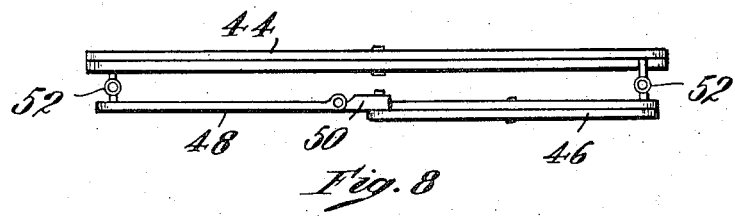
FIG. 8 is a plan view of a modified expansion device shown contracted.
Figure 9:
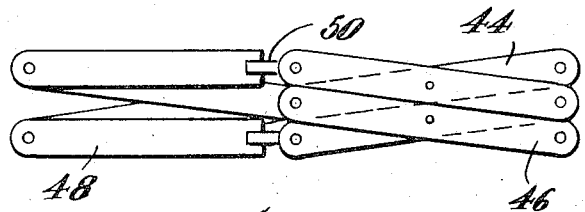
FIG. 9 is a front view of the contracted device as modified clearly showing the substituted cross arms.
Figure 10:
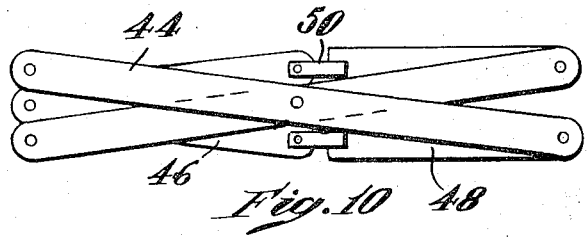
FIG. 10 is a rear view of the contracted device as modified.
Figure 11:
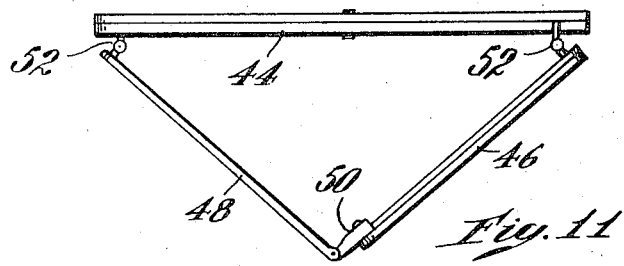
FIG. 11 is a plan view of the extended device as modified.
Figure 12:
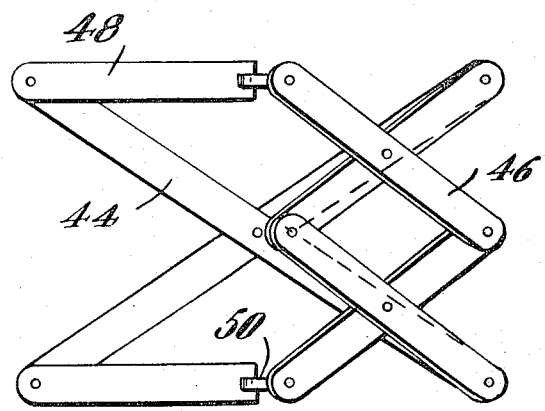
FIG. 12 is a front view of the extended device as modified.
Figure 13:
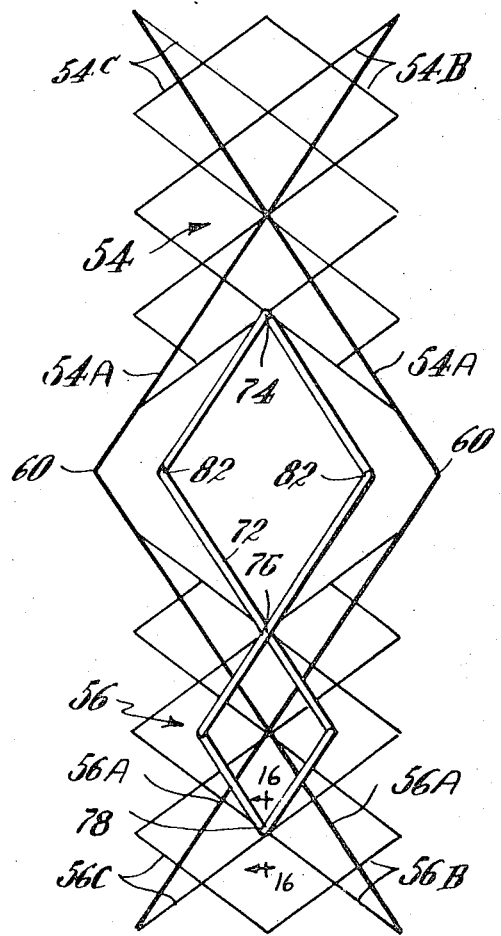
FIG. 13 is a partially schematic front view of an extended apparatus wherein two devices are disposed end-to-end about a pair of breaking joints and the superimposed lazy tong is attached thereto.
Figure 14:
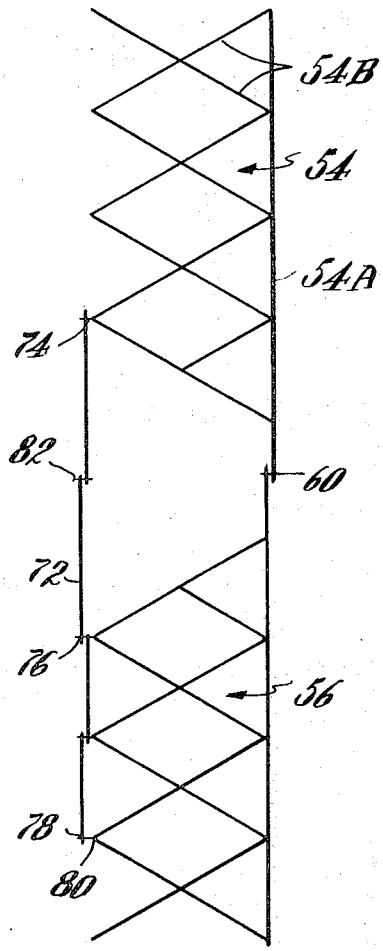
FIG. 14 is a schematic side view of the extended apparatus.

When this particular embodiment is fully contracted the three sets of links 10, 12 and 14 occupy two adjacent parallel planes with the two smaller sets of links 10 and 12 in side-by-side relation forming one plane and the links of the larger set 14 forming the second. This contracted embodiment is shown in FIGS. 1-5. Since the embodiment is relatively flat when contracted, it can easily be lowered by rotating the contracted device about the guide rod 28 (FIGS. 4 and 5) to a position parallel to the base 20. To extend the device, it is first raised at right angles with the base 20 and is secured in this position by tightening the set-screw 40 against the upper universal joint rod 38. The slidable support 36 is then drawn to the front of the base 20. This movement causes the supports 24, 26 to be drawn along the guide rod 28 toward each other. The combined movement of supports 24, 26 and 36 causes the three sets of links 10, 12 and 14 to be extended upwardly along an axis perpendicular to the base 20 (FIGS. 6 and 7). The suggested embodiment may be maintained in this fully or partially extended manner with a locking means, such as by tightening the locking wing-nut 22 to prevent the lowermost links of the larger set 14 from pivoting about each other. Loosening this wing-nut 22 and the set-screw 40 and moving the slidable support 36 to the rear of the base 20 permits the embodiment to be contracted and lowered with a minimum of time and effort. Note that the cross-section configuration of the sets 10, 12 and 14 of the suggested embodiment is transformed from the parallel arrangement when contracted (FIG. 1) to the triangular section defined by the extended sets (FIG. 6). This novel feature yields an extensible and contractable device that is structurally rigid when extended three-dimensionally and which nonetheless is compact when collapsed.

A modification of the present invention is shown (FIGS. 8 through 12) for the purpose of illustration which also has three sets of collapsible links, two of which are substantially smaller than the third. The larger set of links 44 comprises a lazy tong and corresponds to the larger set of links 14 of the aforementioned embodiment. One of the smaller sets of links 46 also comprises a lazy tong and is shown to correspond to set 12 of the aforementioned embodiment though it must be understood that it can equally correspond to set 10 of the aforementioned embodiment. The third set of links 48 comprises a plurality of parallel cross arms which extend from the ends of the links of the larger set 44 to the ends of selected links of the smaller set 46. The ends of the links of the two smaller sets 46, 48 are pivotally interconnected to each other by hinges 50 and the ends of the links of the larger set 44 are pivotally interconnected to preselected ends of the two smaller sets 46, 48 by hinges 52. These hinges 50, 52, which permit the links to move pivotally in the plane of their respective sets and which permit each set to move swingably with respect to the adjacent set, enable this modified embodiment to function in the same manner and with the same features as the aforementioned embodiment. While the number of links in the smaller set 46 is shown to be less than the number of links in the corresponding smaller set 12, this is solely to emphasize that the operational features of either embodiment remain independent of the number of links in any given set. The links 46 and 48 are preferably equal in length but not necessarily equal so long as the sum of the two approximates the length of the longer links.

Figure 15:
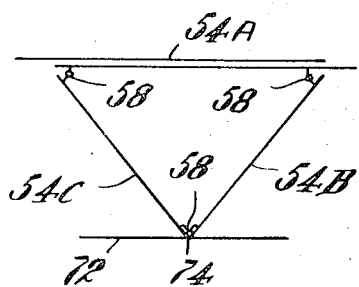
FIG. 15 is a schematic plan view of the extended apparatus.
Figure 19:
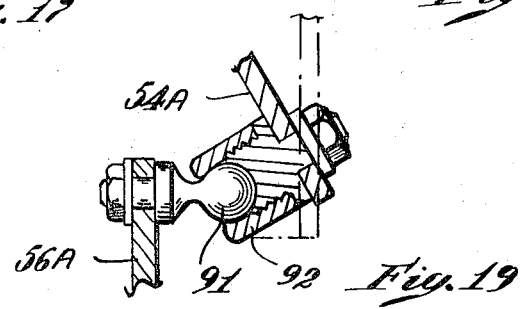
FIG. 19 is a section of a ball-and-socket joint.
Figure 20:
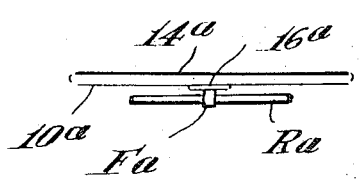

A final embodiment chosen for the purpose of illustration is an apparatus principally comprising two structures, each of which is a first mentioned embodiment, disposed in end-to-end relation. To avoid repetition at the expense of clarity, these two structures are schematically presented in FIGS. 13–15, 17 and 18 generally indicated at 54 and 56. The links of the larger sets are dashed and identified respectively as 54A and 56A and those of the two smaller sets of each structure are identified respectively as 54B, 54C and 56B, 56C. The ends of each set of links are interconnected to the adjacent ends of other sets by hinges 58 (FIG. 15). Structures 54 and 56 are connected to each other by a pair of breaking joints 60. As shown in FIG. 19 the breaking joints may comprise a ball 91 and socket 92.

Figure 16:
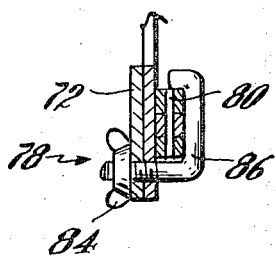
FIG. 16 is an enlarged section on line 16—16 of FIG. 13.
Figures 17, 18:
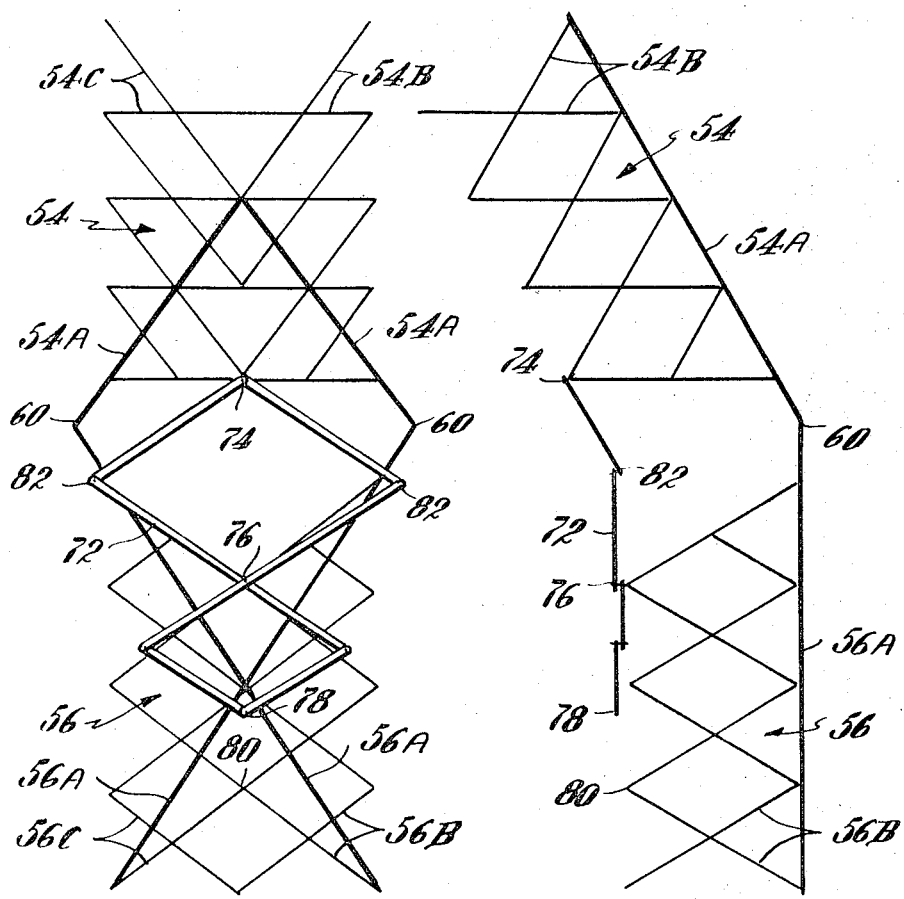
FIG. 17 is a partially schematic front view of the extended apparatus wherein the upper device is deflected to the front.
FIG. 18 is a schematic side view of the extended apparatus wherein the upper device is deflected to the front.

Structures 54 and 56 are further connected to each other by a lazy tong 72 that is superimposed on the apparatus and pivotally attached thereto through three pivot joints 74, 76, 78 of lazy tong 72. Joint 74 is attached to the lowermost hinge 58 that interconnects the links of the two smaller sets 54B, 54C; joint 76 is attached to the uppermost hinge 58 that interconnects the links of the two smaller sets 56B, 56C; and, while joint 78 can be attached to any hinge 58 not uppermost that also interconnects the links of the two smaller sets 56B, 56C, it is shown attached to that hinge 80 wherein the pitch of the links of the lazy tong 72 is made equal to the pitch of the larger links 54A, 56A. This equality in pitch yields a straight-line extension and contraction of the apparatus. The lateral ends of the links of this lazy tong 72 that are connected to joints 74 and 76 are themselves interconnected by a pair of breaking joints 82 which are identical to the joints 60. Whereas the superimposed lazy tong 72 is securely attached to the apparatus at joints 74 and 76, it is removably attached at joint 78 as by a wing-nut 84 and an L-shaped bolt 86 which passes through the links of the lazy tong 72 and grips the selected hinge 80 (see FIG. 16). With this lazy tong 72 attached to hinge 80, the apparatus can be collapsed into a relatively flat body as readily as could be the prior embodiments; extended, the apparatus is three-dimensional and again structurally rigid. When the joint 78 is disengaged from the hinge 80, the joint 78 of the lazy tong 72 can now be raised or lowered with respect to the hinge 80. Raising joint 78 contracts lazy tong 72. Accordingly, the joint 74 is moved downwardly to joint 76 and, since the larger links 54A, 56A remain extended, breaking joints 60, 82 are forwardly deflected and the entire upper structure 54 is deflected forwardly about the axis of the breaking joints 60 (FIGS. 17, 18). Conversely, lowering joint 78 extends the lazy tong 72 so that the joint 74 is moved upwardly away from joint 76 and, again since the larger links 54A, 56A remain extended, breaking joints 60, 82 are now rearwardly deflected and the entire upper structure 54 is deflected rearwardly about the axis of the breaking joints 60 (not shown). Portions of adjacent links of the smaller sets 54B, 54C and 56B, 56C have been omitted to permit a greater forward deflection. The feature of deflectability in a three-dimensional extended device greatly enhances the versatility of such devices. The superposed set may be attached to either or both sets of short links so long as the plane of the superposed tongs is parallel to the set of longer links and the superposed tongs are attached to both set of short links at some point other than the link intersection, in which case the pitch of the superposed tongs should be the same as the pitch of the set of long links.

While the number of larger links in each set 14, 44, 54A and 56A has been shown to constitute but one pair, any number of pairs of such larger links can be employed. Similarly, while the latter two embodiments have not been depicted with a base and mounting means, they each can equally be used in conjunction with such a base 20 and mounting means as are shown in the first embodiment.

The construction shown in FIGS. 20 to 23 is like that shown in FIGS. 1 to 7 and corresponding parts are correspondingly designated. Thus 10a and 12a are the two sets of short links and 14a is the set of long links. The hinges between the short links are indicated at 16a. This construction differs from that shown in FIGS. 1 to 7 only in the addition of the rungs Ra which are secured to the hinges 16a by fasteners Fa.

Figure 24:
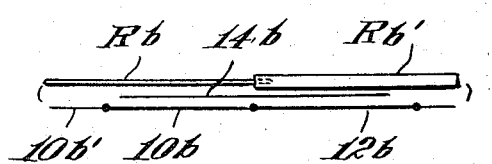
Figure 21:
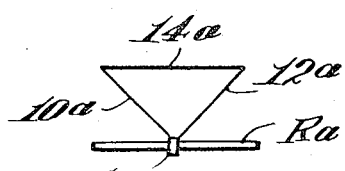
Figure 25:
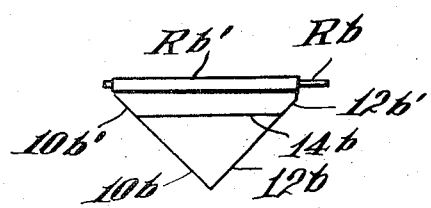
Figure 26:
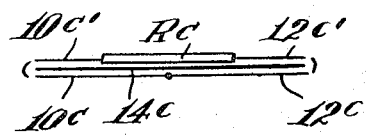
Figure 27:
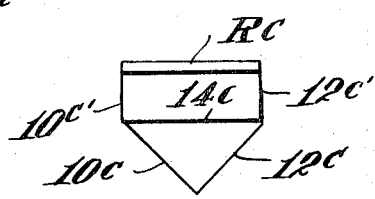
Figure 22:
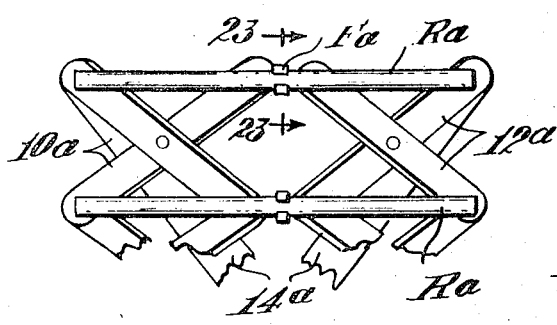
Figure 23:
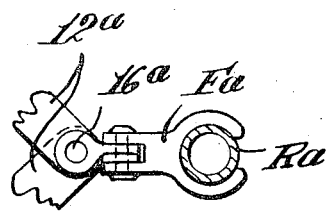
Figures 28, 29:
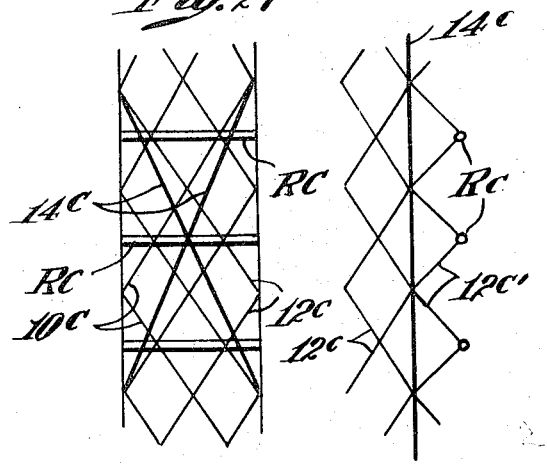
Figure 41:
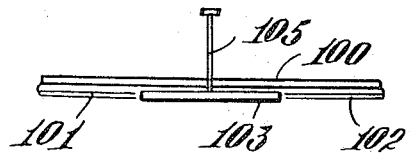
FIG. 41 is a plan view of another embodiment collapsed.
Figure 42:
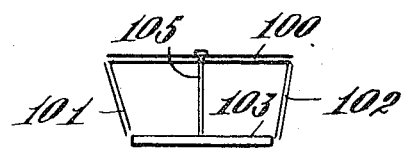
FIG. 42 is a similar view of the same embodiment extended.
Figure 46:
FIG. 46 is a plan view of still another embodiment collapsed.
Figure 47:
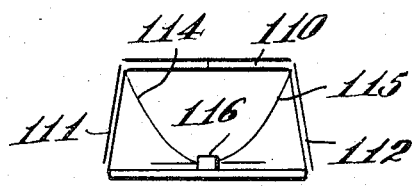
FIG. 47 is a plan view of the same embodiment extended.
Figures 43, 44:
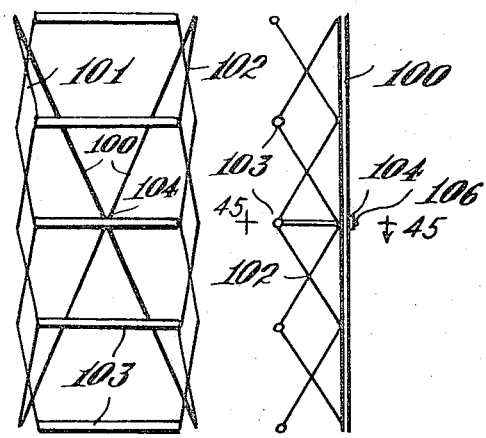
FIG. 43 is a front view extended.
FIG. 44 is a side view extended.
Figure 48:
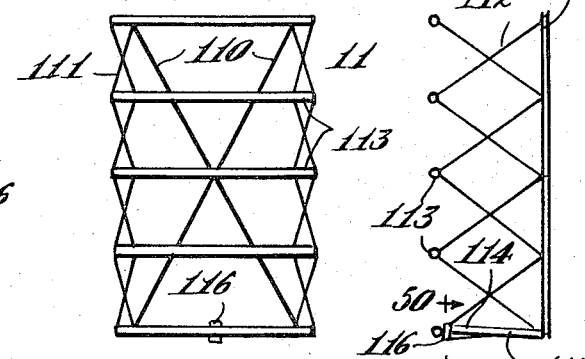
FIG. 48 is a front view extended.
Figure 49:
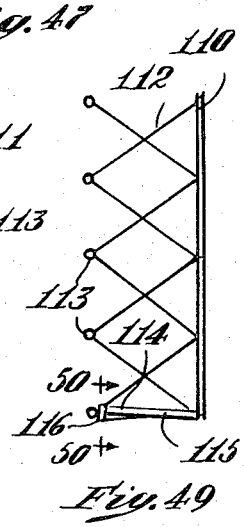
FIG. 49 is a side view extended.
Figure 45:
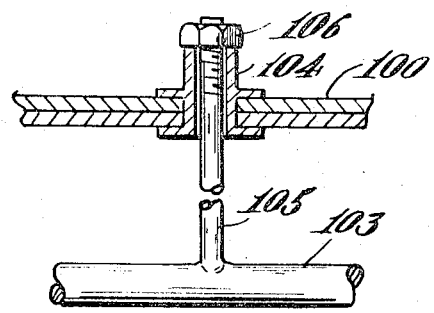
FIG. 45 is a section on line 45—45 of FIG. 44.
Figure 50:
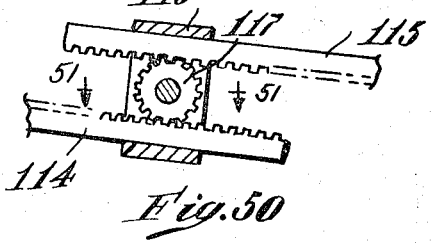
FIG. 50 is a section on line 50—50 of FIG. 49.
Figure 51:
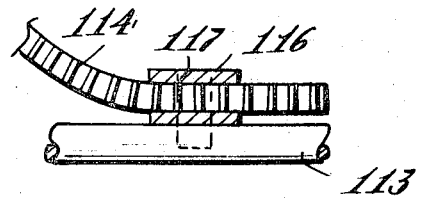
FIG. 51 is a section on line 51—51 of FIG. 50.

The modification shown in FIGS. 24 and 25 differs from that shown in FIGS. 20 to 23 in that the short links 10b and 12b have extensions 10b' and 12b' extending beyond the plane of the long links 14b and the rungs are pivotally connected to the ends of the extensions 10b' and 12b'. Each rung comprises inner and outer parts Rb and Rb' which telescope together.

The modification shown in FIGS. 26 to 29 is like that shown in FIGS. 1 to 7 in that it comprises two sets of short links 10c and 12c and one set of long links 14c. In addition it has two sets of lazy tong links 10c' and 12c' interconnecting the rungs Rc with the structure shown in FIGS. 1 to 7, the lazy tong links 10c' and 12c' being hinged to the rungs and triangular structure respectively.

The modification shown in FIGS. 30 to 33 has two triangular structures 44d–46d–48d and 44d'–46d'–48d', 44d and 44d' being the long links, the short links 46d being common to the two triangular structures and the rungs 48c and 48c' corresponding to the short cross links 48 in FIGS. 8 to 12, the two rungs 48d and 48d' being hinged together at their juxtaposed ends so as to fold together as shown in FIG. 30.

The modification shown in FIGS. 34 to 37 is like that shown in FIGS. 30 to 32 in that it comprises two triangular structures 44e–46e–48e and 44e'–46e'–48e'. However it differs in that the two rung parts 48e and 48e' are integrally connected instead of being hinged together, 44e and 44e' are the long links corresponding to 44 of FIGS. 8 to 12, 46e and 46e' are the short links corresponding to 46 in FIGS. 8 to 12 and 48e and 48e' correspond to the short links 48 in FIGS. 8 to 12.

The embodiment shown in FIGS. 41 to 45 comprises three sets of lazy tongs, set 100 having long links and the two sets 101 and 102 having relatively short links, the sets being hinged together as above described and crossbars 103 having their opposite ends connected to the two sets of short links with hinges which permit the device to be expanded from the collapsed position shown in FIG. 1 to the extended position shown in FIGS. 42 to 45. At one or more of the intersections of the long links 100 are bearings 104 and extending through each bearing is a stud 105 fast to a bar 103 and carrying a nut 106 on its rear end to afford structural rigidity when the device is extended.

The embodiment shown in FIGS. 46 to 51 is similar to the embodiment shown in FIGS. 41 to 45 in that it has three sets of lazy tongs, a set 110 having long links and two sets 111 and 112 having relatively short links and crossbars 113 hinged to the short links. However instead of having studs 105 to afford rigidity this modification comprises flexible racks 114 and 115 having their rear ends hinged to the lazy tong set 110 and their free ends sliding through a guide 116 fast to a bar 113. Between the two racks is a pinion 117 to interconnect the two racks. A pair of racks 114–115 may be provided at one or more bars 113 which are located opposite the ends of the long links 110.

While the ladders of FIGS. 20 to 51 may be held in extended position by friction clamps such as shown in FIG. 19, they may be held more firmly by holders comprising an upright 91 having a handle 92 at one end and pins 93 distributed along one side of the upright (FIGS. 38 to 40). To receive these ladder holders the fasteners F shown in FIG. 23 may be modified as shown at Fa' in FIG. 40 by adding an integral ring 94 having a slot 95 on one side. To apply a holder to a ladder after the ladder is extended the upright 91 is inserted lengthwise through two of the rings 94 with the pins 93 in line with the slot 95 as shown in FIG. 39 and the upright 91 is then turned 90° to the position shown in FIGS. 38 and 40 where a pin 93 is disposed under the fastener Fa' of one rung and another pin is disposed over the fastener of a lower rung.

It should be understood that the present disclosure is for the purpose of illustration only and that this invention includes all further modifications and equivalents which fall within the scope of the appended claims.

I claim.

1. A lazy-tong device comprising three or more sets of collapsible links which, when the device is extended, are disposed respectively in different planes meeting at corners to define a polygonal space, the ends of each set of links being pivotally interconnected to the ends of the next adjacent sets at the aforesaid corners with hinges which pivot both lengthwise and crosswise of said planes, one of said sets comprising long links and the other sets each comprising relatively short links, and the lengths of the links of said one set approximating the sum of the lengths of the links of the other sets, whereby the links of the two sets lie approximately parallel when the device is collapsed.

2. A lazy-tong device according to claim 1 wherein said one set consists of a single lazy tong the links of which approximate the sum of the lengths of the links of the other set.

3. A lazy-tong device comprising three sets of collapsible links which, when the device is extended, are disposed respectively in three planes meeting at three corners to define a triangular space, the ends of each set of links being pivotally interconnected to the adjacent ends of the other sets at said corners with hinges which pivot both lengthwise and crosswise of said planes, one of said sets comprising long links and the other two sets each comprising relatively short links, and the length of the long links approximating the sum of the lengths of the other two sets, whereby the short links lie approximately parallel to the long links when the device is collapsed.

4. A device according to claim 3 wherein two of said sets each comprises a lazy tong and the other set comprises cross arms.

5. A device according to claim 3 wherein each of said sets comprises a lazy tong.

6. A device according to claim 3 further characterized by a base, a support at each of said corners to support the sets on the base, the support at the corner between the short links being movable along the base transversely of the plane of the long links and the supports at the other two corners being movable along the base longitudinally of the plane of the long links.

7. A device according to claim 6 further characterized by guide means on the base for said last two supports.

8. A device according to claim 7 further characterized by a guide on the base for the support at the corner between the short links, the guide extending at right angles to said guide means.

9. A device according to claim 3 further characterized by a base to support said sets, the ends of the lowermost links being mounted on the base with hinges which pivot transversely of the plane of the long links so that when collapsed the sets may be folded against the base.

10. A deflectable lazy-tong apparatus comprising at least two devices according to claim 3 which are disposed in end-to-end relation, the ends of the long links of each of said devices being pivotally interconnected by a first pair of breaking joints which pivot both longitudinally and transversely of the plane of the long links, and a superimposed lazy tong pivotally attached to said apparatus at selected points along the corner between the short links of the two devices respectively.

11. An apparatus according to claim 10 further characterized by a second pair of breaking joints interconnecting lateral ends of links of said superimposed lazy tong, the axes of each of said first and second pairs of joints lying in a plane that bisects the angle defined by the planes of the long links of the two interconnected devices, whereby said apparatus when extended may be deflected about the axis of said first pair of breaking joints.

12. A device according to claim 3 wherein rungs extend transversely of the device at spaced locations lengthwise of the device.

13. A device according to claim 12 wherein said rungs are attached to the hinges between the sets of short links.

14. A device according to claim 12 wherein the short links have extensions beyond the plane of the long links and the rungs are connected to the extensions.

15. A device according to claim 12 wherein additional sets of lazy tongs are disposed beyond the plane of the long lazy tongs and the rungs are attached to said additional sets.

16. A device according to claim 12 wherein additional sets of links form an additional triangular space.

17. A device according to claim 16 wherein said rungs each comprises two parts forming sides of the two triangular spaces respectively.

18. A device according to claim 17 wherein said two parts of the rungs are hinged together end to end.

19. A device according to claim 17 wherein said two parts of the rungs are integrally connected end to end.

References Cited

UNITED STATES PATENTS

| | | | |
|---|---|---|---|
| 999,126 | 7/1911 | Sistermann | 182—141 |
| 1,947,647 | 2/1934 | Holden | 182—141 |
| 2,396,034 | 3/1946 | Baker | 182—158 |
| 2,567,302 | 9/1951 | Sip | 182—157 |
| 3,053,351 | 9/1962 | Fulcher | 182—157 |

REINALDO P. MACHADO, *Primary Examiner.*